United States Patent
Liu et al.

(10) Patent No.: US 8,874,589 B1
(45) Date of Patent: Oct. 28, 2014

(54) ADJUST SIMILAR USERS IDENTIFICATION BASED ON PERFORMANCE FEEDBACK

(75) Inventors: Jia Liu, Sunnyvale, CA (US); Yijian Bai, San Ramon, CA (US); Manojav Patil, Sunnyvale, CA (US); Deepak Ravichandran, Mountain View, CA (US); Sittichai Jiampojamarn, Sunnyvale, CA (US); Shankar Ponnekanti, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/550,073

(22) Filed: Jul. 16, 2012

(51) Int. Cl.
*G06F 17/30* (2006.01)

(52) U.S. Cl.
USPC .......................................................... 707/749

(58) Field of Classification Search
CPC ............................... G06F 17/30; G06Q 30/02
USPC .......................................................... 707/749
See application file for complete search history.

(56) References Cited

U.S. PATENT DOCUMENTS

| | | | |
|---|---|---|---|
| 5,901,255 A | 5/1999 | Yagasaki | |
| 5,974,398 A | 10/1999 | Hanson et al. | |
| 6,185,514 B1 | 2/2001 | Skinner et al. | |
| 6,266,649 B1 * | 7/2001 | Linden et al. | 705/7.29 |
| 6,269,351 B1 | 7/2001 | Black | |
| 6,295,504 B1 | 9/2001 | Ye et al. | |
| 6,487,538 B1 | 11/2002 | Gupta et al. | |
| 6,539,375 B2 | 3/2003 | Kawasaki | |
| 6,560,578 B2 | 5/2003 | Eldering | |
| 6,567,797 B1 | 5/2003 | Schuetze et al. | |
| 6,581,058 B1 | 6/2003 | Fayyad et al. | |
| 6,598,054 B2 | 7/2003 | Schuetze et al. | |
| 6,973,436 B1 | 12/2005 | Shkedi | |
| 6,982,726 B1 | 1/2006 | Berestov | |
| 7,003,566 B2 | 2/2006 | Codella et al. | |
| 7,103,584 B2 | 9/2006 | Lee | |
| 7,202,791 B2 | 4/2007 | Trajkovic | |
| 7,203,909 B1 | 4/2007 | Horvitz et al. | |
| 7,257,546 B2 | 8/2007 | Ebrahimi et al. | |
| 7,272,065 B2 | 9/2007 | Lovett | |
| 7,454,705 B2 | 11/2008 | Cadez et al. | |
| 7,685,278 B2 | 3/2010 | Cohen et al. | |
| 7,693,836 B2 | 4/2010 | Brave et al. | |

(Continued)

OTHER PUBLICATIONS

U.S. Appl. No. 13/551,236, filed Jul. 17, 2012, Jia Liu et al.

(Continued)

*Primary Examiner* — Sherief Badawi
*Assistant Examiner* — Courtney Harmon
(74) *Attorney, Agent, or Firm* — Foley and Lardner LLP; John D. Lanza (57) ABSTRACT

A method of setting a threshold similarity score value for a first plurality of network user identifiers. The first plurality of network user identifiers, a second plurality of network user identifiers and characteristic data associated with the network user identifiers is received. A performance target and an experimental threshold similarity score value are designated. A similarity score between the first and second plurality of network user identifiers is calculated. Performance statistics data for each of the second plurality of network user identifiers having a similarity score greater than or equal to the experimental threshold similarity score value is collected and compared to the similarity score of the network user identifier. Based on the comparison, the experimental threshold similarity score value is adjusted to a similarity score value that achieves the performance target and the threshold similarity score value is set to the adjusted experimental threshold similarity score value.

20 Claims, 5 Drawing Sheets

(56) References Cited

U.S. PATENT DOCUMENTS

| | | | |
|---|---|---|---|
| 7,693,863 B2 | 4/2010 | Martin et al. | |
| 7,711,735 B2 | 5/2010 | Wu et al. | |
| 7,734,632 B2 | 6/2010 | Wang | |
| 7,739,314 B2 | 6/2010 | Datar et al. | |
| 7,769,786 B2 | 8/2010 | Patel | |
| 7,809,740 B2 | 10/2010 | Chung et al. | |
| 7,822,636 B1 | 10/2010 | Ferber et al. | |
| 7,882,175 B1 | 2/2011 | Nayfeh et al. | |
| 7,904,448 B2 | 3/2011 | Chung et al. | |
| 8,026,944 B1 | 9/2011 | Sah | |
| 8,027,964 B2 | 9/2011 | Boulis | |
| 8,095,484 B2 | 1/2012 | Cheng et al. | |
| 8,095,523 B2 | 1/2012 | Brave et al. | |
| 8,117,211 B2 | 2/2012 | Yamamoto et al. | |
| 8,131,733 B2 | 3/2012 | Wang | |
| 8,260,656 B1* | 9/2012 | Harbick et al. | 705/7.31 |
| 8,321,934 B1 | 11/2012 | Cooley et al. | |
| 8,370,321 B2 | 2/2013 | Chu et al. | |
| 8,527,526 B1 | 9/2013 | Liu et al. | |
| 8,566,422 B2 | 10/2013 | Johnson et al. | |
| 8,768,867 B1 | 7/2014 | Thaeler et al. | |
| 2003/0033196 A1 | 2/2003 | Tomlin | |
| 2003/0033336 A1 | 2/2003 | Gremmert | |
| 2003/0220975 A1 | 11/2003 | Malik | |
| 2004/0030667 A1 | 2/2004 | Xu et al. | |
| 2004/0090472 A1 | 5/2004 | Risch et al. | |
| 2004/0215509 A1 | 10/2004 | Perry | |
| 2005/0049907 A1 | 3/2005 | Kumar et al. | |
| 2005/0086105 A1 | 4/2005 | McFadden et al. | |
| 2006/0015487 A1 | 1/2006 | Vest | |
| 2006/0026062 A1 | 2/2006 | Collins | |
| 2006/0059144 A1 | 3/2006 | Canright et al. | |
| 2006/0064411 A1 | 3/2006 | Gross et al. | |
| 2006/0069612 A1 | 3/2006 | Hurt et al. | |
| 2006/0069616 A1 | 3/2006 | Bau | |
| 2006/0136294 A1 | 6/2006 | Linden et al. | |
| 2006/0241923 A1 | 10/2006 | Xu et al. | |
| 2007/0061195 A1 | 3/2007 | Liu et al. | |
| 2007/0067297 A1 | 3/2007 | Kublickis | |
| 2007/0073579 A1 | 3/2007 | Immorlica et al. | |
| 2007/0130005 A1 | 6/2007 | Jaschke | |
| 2007/0156458 A1 | 7/2007 | Benja-Athon et al. | |
| 2007/0156519 A1 | 7/2007 | Agassi et al. | |
| 2007/0179846 A1 | 8/2007 | Jain et al. | |
| 2007/0233556 A1 | 10/2007 | Koningstein | |
| 2008/0071929 A1 | 3/2008 | Motte et al. | |
| 2008/0108308 A1 | 5/2008 | Ullah | |
| 2008/0126176 A1 | 5/2008 | Iguchi | |
| 2008/0140524 A1 | 6/2008 | Anand et al. | |
| 2008/0147659 A1 | 6/2008 | Chen et al. | |
| 2008/0154717 A1 | 6/2008 | Saifee et al. | |
| 2008/0189174 A1 | 8/2008 | Moore | |
| 2008/0201216 A1 | 8/2008 | Almeida | |
| 2008/0215348 A1 | 9/2008 | Guldimann et al. | |
| 2008/0294584 A1* | 11/2008 | Herz | 706/46 |
| 2008/0300958 A1 | 12/2008 | Gluck | |
| 2009/0006974 A1 | 1/2009 | Harinarayan et al. | |
| 2009/0012852 A1 | 1/2009 | O'Kelley et al. | |
| 2009/0048925 A1 | 2/2009 | Song et al. | |
| 2009/0077495 A1 | 3/2009 | Bhat et al. | |
| 2009/0164274 A1 | 6/2009 | Narayanaswamy et al. | |
| 2009/0164395 A1 | 6/2009 | Heck | |
| 2009/0222734 A1 | 9/2009 | Fuller et al. | |
| 2009/0228397 A1 | 9/2009 | Tawakol et al. | |
| 2009/0248494 A1 | 10/2009 | Hueter et al. | |
| 2009/0265243 A1 | 10/2009 | Karassner et al. | |
| 2009/0281923 A1 | 11/2009 | Selinger et al. | |
| 2009/0292386 A1 | 11/2009 | Cheng et al. | |
| 2009/0327032 A1 | 12/2009 | Gunawardana et al. | |
| 2010/0004975 A1 | 1/2010 | White et al. | |
| 2010/0042500 A1 | 2/2010 | Pritchard et al. | |
| 2010/0042502 A1 | 2/2010 | Farmanfarmaian et al. | |
| 2010/0082421 A1 | 4/2010 | Tuladhar et al. | |
| 2010/0121850 A1 | 5/2010 | Moitra et al. | |
| 2010/0131835 A1 | 5/2010 | Kumar et al. | |
| 2010/0138291 A1 | 6/2010 | Silverman et al. | |
| 2010/0169342 A1* | 7/2010 | Kenedy et al. | 707/758 |
| 2010/0217648 A1 | 8/2010 | Agarwal et al. | |
| 2010/0228614 A1 | 9/2010 | Zhang et al. | |
| 2010/0235241 A1 | 9/2010 | Wang et al. | |
| 2010/0250558 A1 | 9/2010 | Wang | |
| 2010/0274753 A1 | 10/2010 | Liberty et al. | |
| 2010/0293057 A1 | 11/2010 | Haveliwala et al. | |
| 2010/0318374 A1 | 12/2010 | Flake et al. | |
| 2010/0325666 A1 | 12/2010 | Wiser et al. | |
| 2011/0010324 A1 | 1/2011 | Bolivar et al. | |
| 2011/0055008 A1 | 3/2011 | Feuerstein et al. | |
| 2011/0055012 A1 | 3/2011 | Christianson et al. | |
| 2011/0071900 A1 | 3/2011 | Kamath et al. | |
| 2011/0077998 A1 | 3/2011 | Yan et al. | |
| 2011/0106796 A1 | 5/2011 | Svaic | |
| 2011/0145248 A1 | 6/2011 | Doliov | |
| 2011/0153423 A1 | 6/2011 | Elvekrog et al. | |
| 2011/0166926 A1 | 7/2011 | Lv et al. | |
| 2011/0173198 A1 | 7/2011 | Malleshaiah et al. | |
| 2011/0191176 A1 | 8/2011 | Merriman et al. | |
| 2011/0191714 A1 | 8/2011 | Ting et al. | |
| 2011/0225608 A1 | 9/2011 | Lopatecki et al. | |
| 2011/0231241 A1 | 9/2011 | Kesari et al. | |
| 2011/0231257 A1 | 9/2011 | Winters | |
| 2011/0231264 A1 | 9/2011 | Dilling et al. | |
| 2011/0246267 A1 | 10/2011 | Williams et al. | |
| 2011/0258039 A1 | 10/2011 | Patwa et al. | |
| 2011/0264522 A1 | 10/2011 | Chan et al. | |
| 2011/0270560 A1 | 11/2011 | Wang et al. | |
| 2011/0288937 A1 | 11/2011 | Manoogian et al. | |
| 2012/0010939 A1 | 1/2012 | Krishnamoorthy et al. | |
| 2012/0047013 A1 | 2/2012 | Bigby et al. | |
| 2012/0047022 A1 | 2/2012 | Shamim et al. | |
| 2012/0047132 A1 | 2/2012 | Fleming et al. | |
| 2012/0059707 A1 | 3/2012 | Goenka et al. | |
| 2012/0166530 A1 | 6/2012 | Tseng | |
| 2012/0179543 A1 | 7/2012 | Luo et al. | |
| 2012/0209568 A1 | 8/2012 | Arndt et al. | |
| 2012/0239506 A1 | 9/2012 | Saunders et al. | |
| 2012/0253928 A1 | 10/2012 | Jackson et al. | |
| 2012/0271782 A1 | 10/2012 | Blowers et al. | |
| 2012/0316972 A1 | 12/2012 | Hu et al. | |
| 2013/0006778 A1 | 1/2013 | Raghunandan | |
| 2013/0047076 A1 | 2/2013 | McElfresh et al. | |
| 2013/0054628 A1 | 2/2013 | Meierhoefer et al. | |
| 2013/0124259 A1 | 5/2013 | Chourey et al. | |
| 2013/0124298 A1 | 5/2013 | Li et al. | |
| 2013/0132415 A1 | 5/2013 | Adams | |
| 2013/0151312 A1 | 6/2013 | Logan | |

OTHER PUBLICATIONS

U.S. Appl. No. 13/362,671, filed Jan. 31, 2012, Jia Liu et al.
U.S. Appl. No. 13/362,797, filed Jan. 31, 2012, Jia Liu et al.
U.S. Appl. No. 13/362,910, filed Jan. 31, 2012, Jia Liu et al.
U.S. Appl. No. 13/460,327, filed Apr. 30, 2012, Jia Liu et al.
U.S. Appl. No. 13/460,411, filed Apr. 30, 2012, Jia Liu et al.
U.S. Appl. No. 13/460,469, filed Apr. 30, 2012, Jia Liu et al.
U.S. Appl. No. 13/462,130, filed May 2, 2012, Jia Liu et al.
U.S. Appl. No. 13/462,425, filed May 2, 2012, Jia Liu et al.
U.S. Appl. No. 13/462,509, filed May 2, 2012, Jia Liu et al.
U.S. Appl. No. 13/462,630, filed May 2, 2012, Jia Liu et al.
U.S. Appl. No. 13/465,679, filed May 7, 2012, Alok Goel et al.
U.S. Appl. No. 13/465,730, filed May 7, 2012, Jia Liu et al.
U.S. Appl. No. 13/465,762, filed May 7, 2012, Jia Liu et al.
U.S. Appl. No. 13/476,532, filed May 21, 2012, Jia Liu et al.
U.S. Appl. No. 13/534,480, filed Jun. 27, 2012, Jia Liu et al.
"Clustering II" Powerpoint, EECS435, Spring 2008, 25 pages.
Bhat, Sudin, et al.; "Dynamic Real-Time Targeting Through Variable-Length Behavioral History", Apr. 18, 2009, © 2009 Microsoft, 4 pages.
http://en.wikipedia.org/wiki/Cluster_analysis; "Cluster Analysis", Wikipedia.org, retrieved Jan. 27, 2012, 15 pages.
http://en.wikipedia.org/wiki/Logistic_regression; "Logistic Regression", Wikipedia.org, retrieved Apr. 2, 2012, 14 pages.
Johnson, Mark; "Confidence Intervals on Likelihood Estimates for Estimating Association Strengths", Brown University, Draft of May 28, 1999, 7 pages.

(56) References Cited

OTHER PUBLICATIONS

Renals, Steve; "Classification and Nearest Neighbours"; Informatics 2B: Learning and Data Lecture 4, Jan. 28, 2011, 27 pages.
support.google.com/adwords/bin/answer.py?hl=en&answer=1209882; "Where Your Ad Can Appear on the Display Network Depending on Your Targeting Methods", support.google.com, retrieved Apr. 16, 2012, 4 pages.
support.google.com/adwords/bin/answer.py?hl=en&answer=171271; "How Do I Create A Custom Combination List?", support.google.com, retrieved Apr. 16, 2012, 3 pages.
www.techterms.com/definition/rpm; "RPM", © 2012 TechTerms.com, retrieved Apr. 9, 2012, 1 page.
Office Action on U.S. Appl. No. 13/362,910 dated Sep. 11, 2013.
Notice of Allowance on U.S. Appl. No. 13/462,130 dated Apr. 22, 2013.
Office Action on U.S. Appl. No. 13/362,671 dated May 8, 2013.
Office Action on U.S. Appl. No. 13/362,797 dated Apr. 24, 2013.
Office Action on U.S. Appl. No. 13/462,630 dated May 8, 2013.
Office Action on U.S. Appl. No. 13/362,671 dated Dec. 31, 2013.
Office Action on U.S. Appl. No. 13/462,509 dated Dec. 27, 2013.
Office Action on U.S. Appl. No. 13/462,630 dated Jan. 14, 2014.
Office Action on U.S. Appl. No. 13/465,762 dated Jan. 16, 2014.
Office Action on U.S. Appl. No. 13/476,532 dated Dec. 30, 2013.
Notice of Allowance on U.S. Appl. No. 13/551,236 dated May 22, 2014.
Notice of Allowance on U.S. Appl. No. 13/551,236 dated Jan. 30, 2014.
Office Action on U.S. Appl. No. 13/363,356 dated Mar. 14, 2014.
Office Action on U.S. Appl. No. 13/462,425 dated Mar. 12, 2014.
US Non Final OA on U.S. Appl. No. 13/363,353 dated Apr. 22, 2014.
US Non Final Office Action on U.S. Appl. No. 13/465,679 dated Apr. 14, 2014.
US Notice of Allowance on U.S. Appl. No. 13/598,331 dated Mar. 20, 2014.
US Office Action on U.S. Appl. No. 13/362,910 dated Apr. 8, 2014.
Office Action on U.S. Appl. No. 13/460,411 dated Jul. 15, 2014.
U.S. Office Action on U.S. Appl. No. 13/362,671 dated Jun. 30, 2014.

\* cited by examiner

ADJUST SIMILAR USERS IDENTIFICATION BASED ON PERFORMANCE FEEDBACK

BACKGROUND

The present disclosure relates generally to similar user identifiers.

From a content provider's perspective, placing content such as a content on a web page may or may not be of interest or useful for the end users viewing the web page. In some systems, the content of a web page may be used to help select more relevant content to be provided with the web page. For example, a retailer or manufacturer selling golf clubs may place content on a website devoted to golf, since visitors to the website may share a common interest in golf. Such systems may use keywords located in the text of the website to identify topics discussed on the website.

SUMMARY

One or more implementations described herein provides a computerized method, system for, and computer-readable medium operable to set a threshold similarity score value for a first plurality of network user identifiers. The first plurality of network user identifiers and characteristic data associated with network activity of each of the first plurality of network user identifiers is received. A performance target and an experimental threshold similarity score value are designated. A second plurality of network user identifiers and characteristic data associated with network activity of each of the second plurality of network user identifiers is received. A similarity score between the first plurality of network user identifiers and each of the second plurality of network user identifiers is calculated. Performance statistics data for each of the second plurality of network user identifiers having a similarity score greater than or equal to the experimental threshold similarity score value is collected. The performance statistics data is compared to the similarity score for each of the second plurality of network user identifiers having a similarity score greater than or equal to the experimental threshold similarity score value. Based in part on the comparison, the experimental threshold similarity score value is adjusted to a similarity score value that achieves the performance target and the threshold similarity score value for the first plurality of network user identifiers is set to the adjusted experimental threshold similarity score value.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION OF ILLUSTRATIVE IMPLEMENTATIONS

According to some aspects of the present disclosure, the online behaviors of user identifiers may be used to provide an audience-based approach to providing relevant content. As used herein, online behavior refers to how a user identifier interacts with web pages on the Internet (e.g., which web pages are visited, the order in which the web pages are visited, how long a particular webpage is viewed, and similar information). In some implementations, a set of user identifiers associated with an online event (e.g., making an online purchase, being added to a content provider's list of user identifiers, etc.) may be used as a basis to determine user identifiers having similar online behaviors.

A user may opt in or out of allowing a content server to identify and store information about the user and/or about devices operated by the user. For example, the user may opt in to receiving content from the content server that may be more relevant to the user. In some implementations, the user may be represented as an anonymous user identifier (e.g., a cookie, a device serial number, etc.) that contains no personally-identifiable information about the user. For example, information relating to the user's name, demographics, etc., may not be used by the content server unless the user opts in to providing such information. Thus, the user may have control over how information is collected about him or her and used by a content server.

In a content-based approach to providing relevant content, content is provided based on the subject matter of a web page. For example, a web page devoted to golf may mention the terms "golf" and other golf-related terms. A content server that places content on the web page may use the subject matter of the webpage itself and/or terms provided as part of a request for content (e.g., via a content tag embedded into the code of the webpage), to determine a theme for the web page. Based on the determined theme, a manufacturer of golf clubs may opt to place content on the web page.

An audience-based approach to providing relevant content, in contrast to the content-based approach, involves selecting content based on the user identifier visiting a web page, instead of the subject matter of the web page itself. For example, a user identifier may be associated with making an online reservation at a golf resort and navigating to a financial web page to check the stock market. Based on golf being a potential interest category associated with the user identifier, for example, content from a manufacturer of golf clubs may be provided with the financial web page, even though the financial web page is unrelated to golf.

A content server may use the content-based approach, the audience-based approach, or a combination of the content-based approach and the audience-based approach to provide relevant content to users.

One or more implementations described herein provide a method that allows a processing circuit to set a threshold similarity score value for a first set of network user identifiers. When a content server attempts to identify network user identifiers that are similar to a first set of network user identifiers, a network user identifier is considered a similar user if a similarity score between the network user identifier and the first set of network user identifiers exceeds a certain threshold level. It is difficult for a content server to set the threshold value, as setting the value too high may result in too few similar users, whereas setting the value too low may result in too many similar users. By setting the threshold similarity score value for a first set of network user identifiers according to the implementations described herein, a content provider may set the value based on real-time or recent performance feedback. In other words, a threshold value may be initially set based on a conservative estimate, but may gradually converge to a desired target performance by reactively adjusting the threshold similarity score value for each set of network user identifiers.

Figure 1:
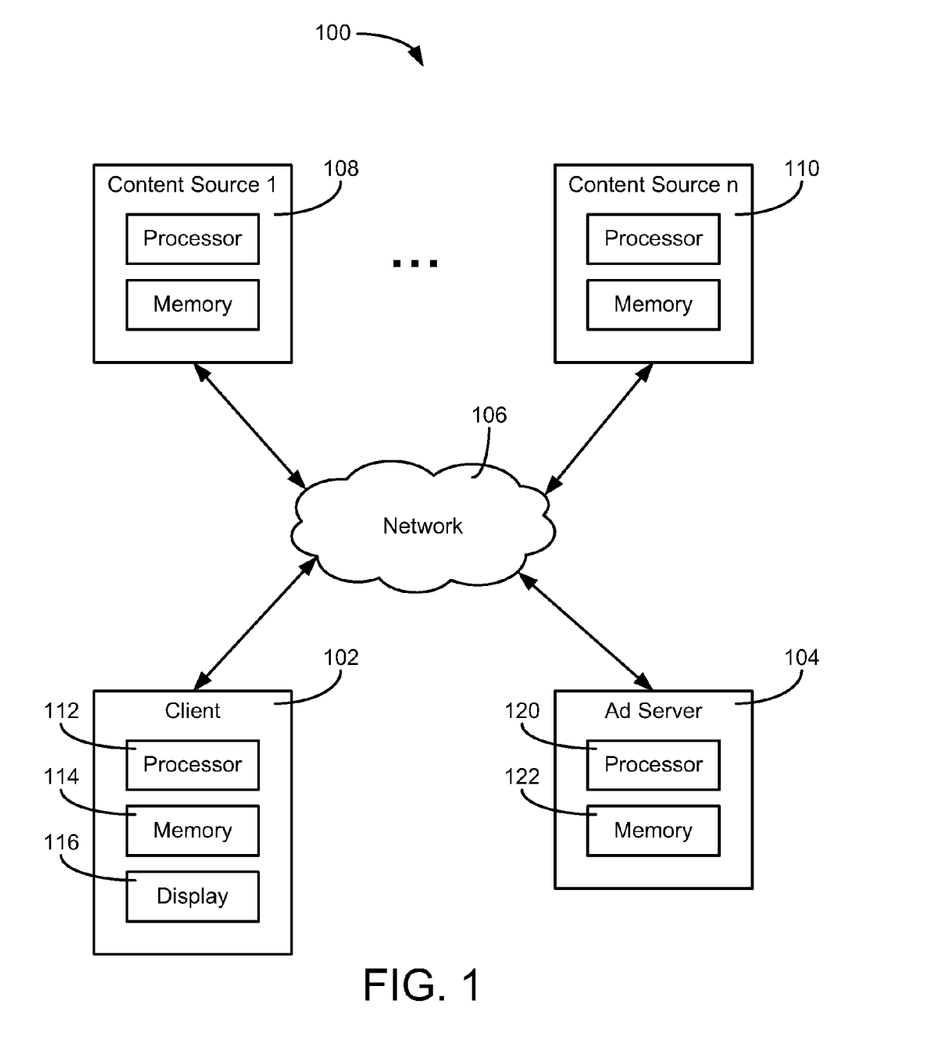
FIG. 1 is a block diagram of a computer system in accordance with an illustrative implementation.

Referring to FIG. 1, a block diagram of a computer system 100 in accordance with a described implementation is shown. System 100 includes a client 102 which communicates with other computing devices via a network 106. For example, client 102 may communicate with one or more content sources ranging from a first content source 108 up to an nth content source 110. Content sources 108, 110 may provide web pages and/or media content (e.g., audio, video, and other forms of digital content) to client 102. System 100 may also include a content server 104, which provides content data to other computing devices over network 106.

Network 106 may be any form of computer network that relays information between client 102, content server 104, and content sources 108, 110. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may further include a floppy disk, CD-ROM, DVD, magnetic disk, memory chip, application-specific integrated circuit (ASIC), field programmable gate array (FPGA), read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays web pages using web page data received from content sources 108, 110 and/or from content server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, web page data, a movie, a sound file, pictures, and other forms of data. Similarly, content server 104 may include a processing circuit including a processor 120 and a memory 122.

In some implementations, content server 104 may include several computing devices (e.g., a data center, a network of servers, etc.). In such a case, the various devices of content server 104 may be in electronic communication, thereby also forming a processing circuit (e.g., processor 120 includes the collective processors of the devices and memory 122 includes the collective memories of the devices).

Content server 104 may provide digital content to client 102 via network 106. For example, content source 108 may provide a web page to client 102, in response to receiving a request for a web page from client 102. In some implementations, content from content server 104 may be provided to client 102 indirectly. For example, content source 108 may receive content data from content server 104 and use the content as part of the web page data provided to client 102. In other implementations, content from content server 104 may be provided to client 102 directly. For example, content source 108 may provide web page data to client 102 that includes a command to retrieve content from content server 104. On receipt of the web page data, client 102 may retrieve content from content server 104 based on the command and display the content when the web page is rendered on display 116.

According to some implementations, content server 104 may be configured to determine whether the online behavior of a user identifier from client 102 is similar to that of other user identifiers. In some cases, content server 104 may determine the similarity between the online behavior associated with a user identifier and that of other user identifiers associated with a desired action, such as purchasing a certain good or navigating to a certain web page. For example, a number of user identifiers may be associated with visiting web pages from content sources 108, 110 devoted to tourist attractions in Seattle and going on to purchase airline tickets to Seattle. In such a case, content server 104 may determine that a user identifier associated with client 102 is similar to those user identifiers associated with a purchase of airline tickets to Seattle based on client 102 navigating to web pages provided by content sources 108, 110.

In some implementations, content server 104 may receive browsing history data to determine the online behaviors of user identifiers around a certain event. In one implementation, content server 104 may use cookies and/or pixel tags to determine an online behavior of a user identifier. For example, a cookie associated with content server 104 may be placed on client 102 and used as a user identifier. Whenever client 102 navigates to a web page that includes content from content server 104, the cookie may be used to identify client 102 as having visited the web page. Other mechanisms to determine a user's browsing history may be used, in various implementations. For example, client 102 may have a unique device ID which may be used to identify client 102 as it navigates between different websites. In some cases, client 102 may navigate to websites that are outside of the content server of content server 104 (e.g., the website does not include content from content server 104). In some implementations, content server 104 may receive publisher-provided data (e.g., user identifiers) from websites that are outside of the content server.

A user of client 102 may opt in or out of allowing content server 104 to identify and store data relating to client 102. For example, the user may opt in to receiving content from content server 104 that may be more relevant to them. In one implementation, the client identifier used by content server 104 may be randomized and contain no personally-identifiable information about the user. For example, information relating to the user's name, demographics, etc., may not be used by content server 104 unless the user opts in to providing such information. Thus, the user of client 102 may have control over how information is collected about them and used by content server 104, in various implementations.

According to various implementations, content server 104 may generate a behavioral model based on the online behaviors of user identifiers associated with an online event, such as visiting a certain web page, purchasing a particular good or service, being added to a list of users by a content provider, or the like. In some implementations, content server 104 may receive a list of user identifiers from a content provider (e.g., a set of cookies or other device identifiers). For example, an online retailer may provide a list of user identifiers associated with purchases of a certain good or service to content server 104. Content server 104 may use the provided list to determine a set of similar user identifiers by comparing the online behaviors of the user identifiers on the list to that of other user identifiers. In some cases, content server 104 may provide an indication of the set of identified user identifiers back to the content provider.

Figure 2:
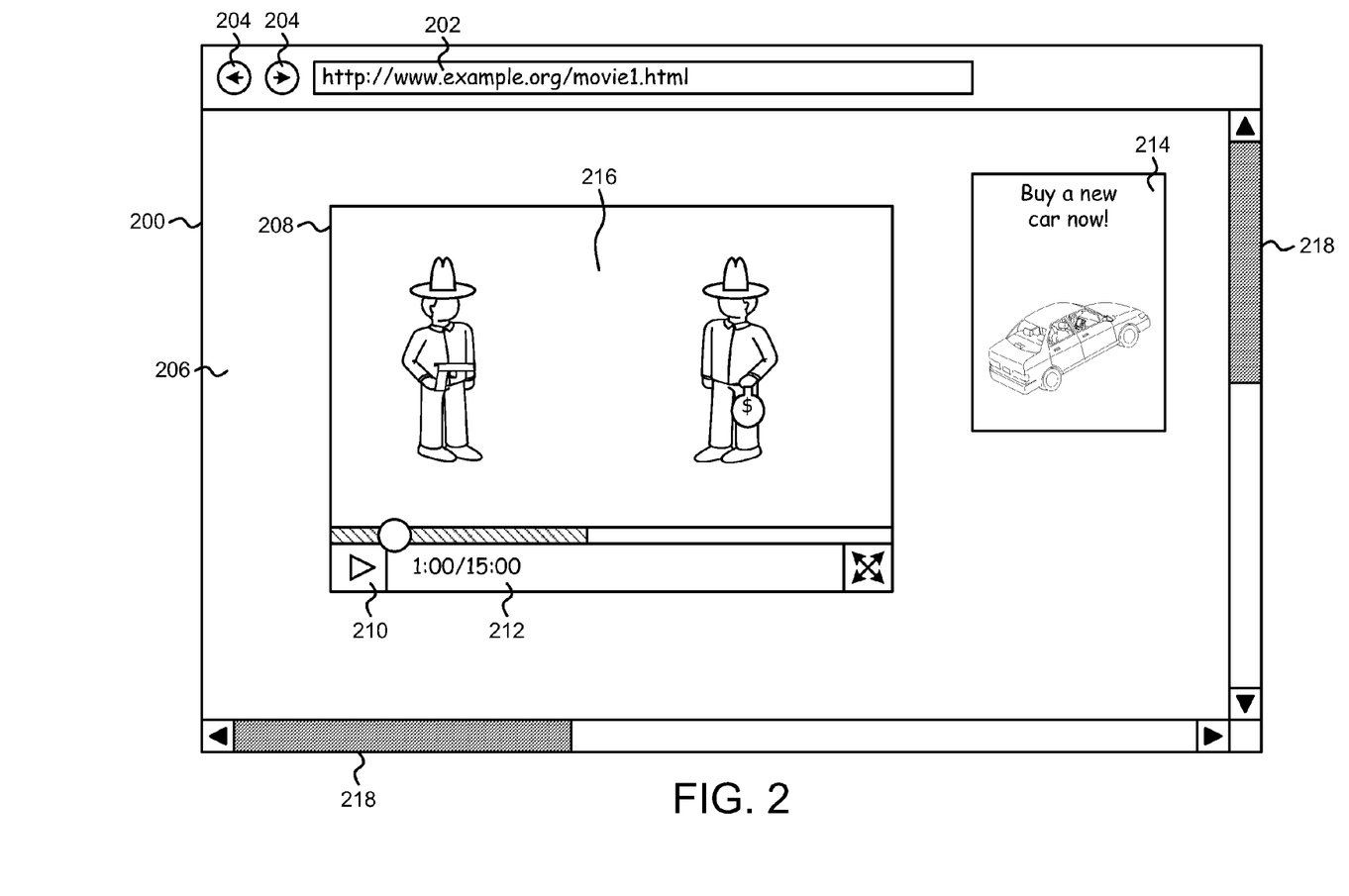
FIG. 2 is an illustration of an example web page having content such as an advertisement.

Referring now to FIG. 2, an example display 200 is shown. Display 200 is in electronic communication with one or more processors that cause visual indicia to be provided on display 200. Display 200 may be located inside or outside of the housing of the one or more processors. For example, display 200 may be external to a desktop computer (e.g., display 200 may be a monitor), may be a television set, or any other stand-alone form of electronic display. In another example, display 200 may be internal to a laptop computer, mobile device, or other computing device with an integrated display.

As shown in FIG. 2, the one or more processors in communication with display 200 may execute a web browser application (e.g., display 200 is part of a client device). The web browser application operates by receiving input of a uniform resource locator (URL) into a field 202, such as a web address, from an input device (e.g., a pointing device, a keyboard, a touchscreen, or another form of input device). In response, one or more processors executing the web browser may request data from a content source corresponding to the URL via a network (e.g., the Internet, an intranet, or the like). The content source may then provide web page data and/or other data to the client device, which causes visual indicia to be displayed by display 200.

The web browser providing data to display 200 may include a number of navigational controls associated with web page 206. For example, the web browser may include the ability to go back or forward to other web pages using inputs 204 (e.g., a back button, a forward button, etc.). The web browser may also include one or more scroll bars 218, which can be used to display parts of web page 206 that are currently off-screen. For example, web page 206 may be formatted to be larger than the screen of display 200. In such a case, one or more scroll bars 218 may be used to change the vertical and/or horizontal position of web page 206 on display 200.

In one example, additional data associated with web page 206 may be configured to perform any number of functions associated with movie 216. For example, the additional data may include a media player 208, which is used to play movie 216. Media player 208 may be called in any number of different ways. In one implementation, media player 208 may be an application installed on the client device and launched when web page 206 is rendered on display 200. In another implementation, media player 208 may be part of a plug-in for the web browser. In another implementation, media player 208 may be part of the web page data downloaded by the client device. For example, media player 208 may be a script or other form of instruction that causes movie 216 to play on display 200. Media player 208 may also include a number of controls, such as a button 210 that allows movie 216 to be played or paused. Media player 208 may include a timer 212 that provides an indication of the current time and total running time of movie 216.

The various functions associated with content 214 may be implemented by including one or more content tags within the web page code located in "moviel.html" and/or other files. For example, "moviel.html" may include a content tag that specifies that a content slot is to be located at the position of content 214. Another content tag may request content from a remote location, for example, from a content server, as web page 206 is loaded. Such a request may include client identification data (e.g., a cookie, device ID, etc.) used by the content server as a user identifier. In this way, the content server is able to determine browsing history associated with a user identifier as it is used to navigate between various web pages that participate in the content server (e.g., web pages that include content from the content server).

Figure 3:
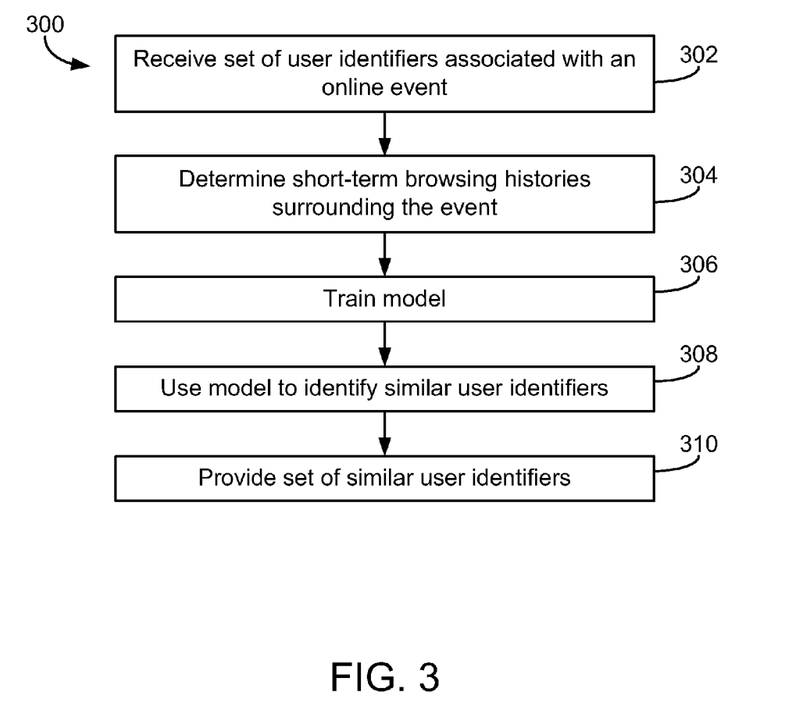
FIG. 3 is an example process for identifying similar online user identifiers.

Referring now to FIG. 3, an example process 300 for determining similar online user identifiers. In some implementations, content providers may compete in an auction for the ability to place relevant content on a given web page. A content provider having access to a set of user identifiers that are similar to other user identifiers associated with making a purchase, for example, may adjust their bid accordingly if one of the similar user identifiers requests a web page having an embedded content.

Process 300 includes receiving data indicative of a set of user identifiers associated with an online event (block 302). In general, an online event may correspond to any action performed by an online user. For example, an online event may correspond to visiting a web page, clicking on a particular link (e.g., a hyperlink, a content link, etc.), navigating between a set of web pages, ending their browsing session, spending a certain amount of time on a given web page, purchasing a good or service, or any other action that may be performed by an online user. In some implementations, the set of users may be represented using device identifiers (e.g., cookies, device IDs, etc.) for the electronic devices operated by the users. In some implementations, the set of user identifiers may also include information about when the event occurred with respect to a user in the set. For example, the received set may include information about when a particular user visited a web page, made a purchase, or performed any other online action.

In one example, an online retailer may wish to place content via a content server. To provide relevant content, the retailer may generate a list of user identifiers associated with visits to the retailer's website and/or purchases made via the website. The list of user identifiers may be a list of cookies, device IDs, or other information that can be used by the content server to determine online behaviors associated with the user identifiers on the list. For example, a mobile telephone having a unique device ID may be used to access the retailer's website. If the user has opted in to allowing information about the user to be collected, the retailer may record the device ID as a user identifier and provide it to the content server. The content server may then use the user identifier to identify similar user identifiers.

Process 300 includes determining short-term browsing histories surrounding the event (block 304). In some implementations, the system that receives the set of user identifiers may retrieve information regarding the browsing histories associated with the user identifiers in the set. For example, a server of a content server may store browsing history information for user identifiers that visited websites participating in the content server (e.g., websites that display content provided by the content server). Such information may be collected, for example, by receiving identification information (e.g., a cookie, device ID, etc.) each time a user identifier is used to access a web page displaying content from the content server. Such information may be used to reconstruct, or partially reconstruct, a user's browsing history, provided that the user has opted in to allowing such information to be used. In other implementations, the browsing history may be predetermined by another device outside of the content server (e.g., the browsing history data may be publisher-provided).

The short-term browsing history for a user identifier refers to data about which web pages were visited within a particular period of the online event. In various implementations, the short-term browsing history for a user identifier surrounding an event may include data about the web pages visited by the user identifier less than one, two, five, twelve, or twenty four hours prior to the event. In some implementations, the short-term browsing history for a user identifier may include data about the web pages visited by the user identifier less than one, two, five, twelve, or twenty four hours after the occurrence of the event. In some implementations, long-term browsing histories may be used (e.g., browsing history data from a period longer than the particular period associated with the short-term browsing history). However, in contrast to long-term browsing history, short-term browsing history may provide more insight into a user identifier's interests surrounding the event. For example, a user may have a long-term interest in professional football. However, the user may have a short-term interest in purchasing flowers for his wife's birthday. Analyzing the user's short-term browsing history surrounding his online purchase of flowers may exclude the topic of football from being associated with the purchase of flowers. According to various implementations, the short-term browsing histories may be determined for the entire set of user identifiers or for a subset of the user identifiers (e.g., a random sampling of the user identifiers, a subset selected up to a predetermined amount of user identifiers, etc.).

Process 300 includes training a behavioral model (block 306). In some implementations, the browsing history data associated with the user identifiers in the received set may be used to train a behavioral model. In general, the behavioral model may determine commonalities among the online behaviors associated with the user identifiers. For example, a large number of user identifiers that purchase organic peanut butter from a retailer may have recently visited a web page devoted to a recipe for an all-organic peanut butter and banana sandwich. Such a characteristic may be used to identify other user identifiers that are also likely to become associated with purchasing organic peanut butter from the retailer.

Process 300 includes using the model to identify similar user identifiers to those in the received set (block 308). In general, the set of similar user identifiers may include device identifiers (e.g., cookies, unique device IDs, etc.) or other information that may be used to determine that a user identifier in the set of similar user identifiers is being used to request a web page. For example, the set of similar user identifiers may be provided to a content provider and used by the content provider to select relevant content. In some implementations, the set of similar user identifiers may be provided to a content server that conducts an auction to place content on a web page (block 310). A content provider may utilize the set of similar user identifiers to adjust auction bids to provide content to those user identifiers. For example, a user identifier that visits a web page devoted to plumbing repairs may have a browsing history similar to that of user identifiers associated with purchasing copper tubing. When the user identifier visits a web page, even a web page unrelated to plumbing, content providers may participate in an auction to place content on the web page. In such a case, a content provider may place a higher bid in the auction to provide content for copper tubing to the user identifier.

Figure 4:
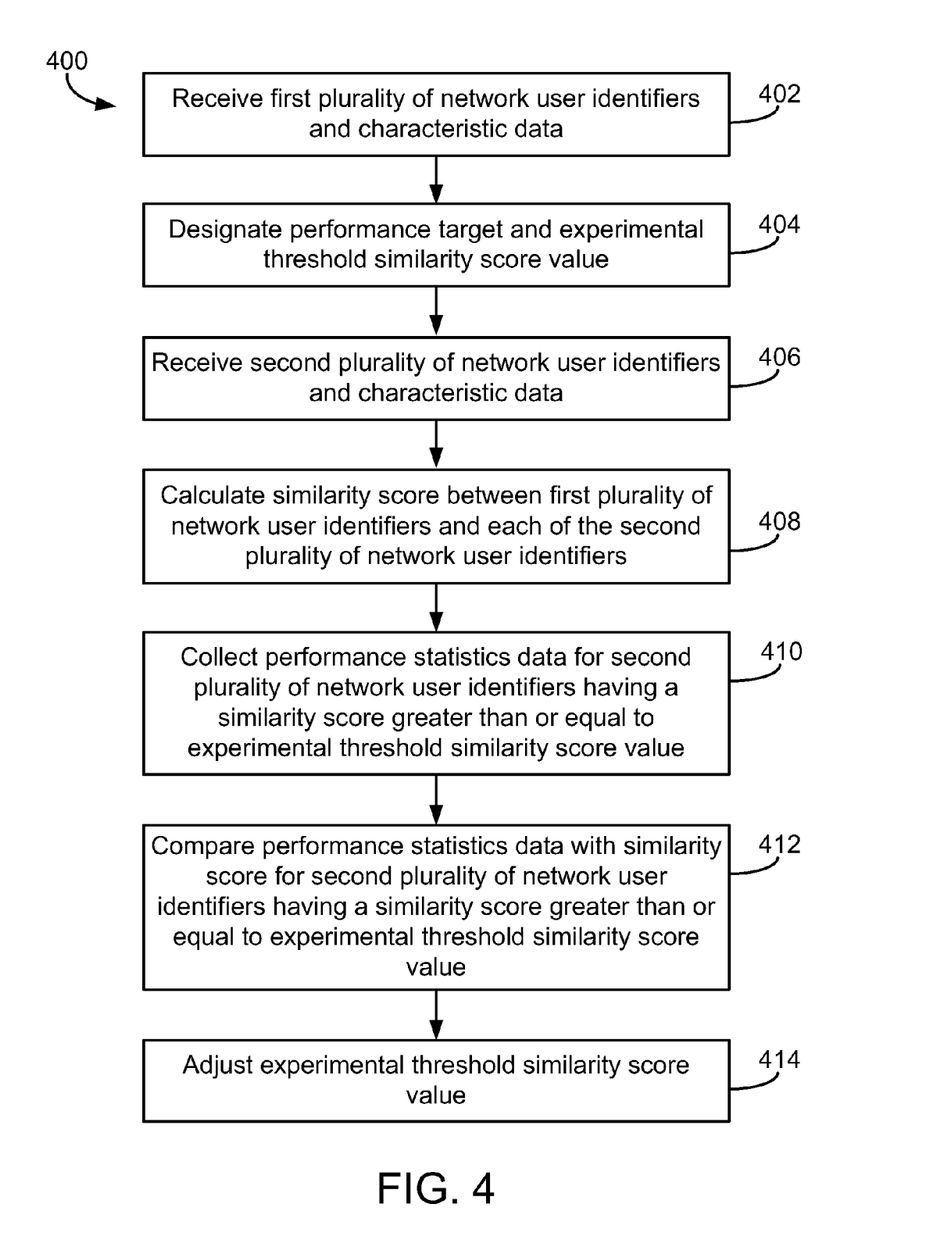
FIG. 4 is an example process for setting a threshold similarity score value for a set of network user identifiers.

In some implementations, as illustrated in FIG. 4, the processing circuit performs process 400 for setting a threshold similarity score value for a first set of network user identifiers. Process 400 may be implemented by a content server or other computing device having access to some or all of a network user's history data.

Process 400 includes receiving a first set of network user identifiers and characteristic data associated with each network user identifier's network activity (block 402). Characteristic data may include, but are not limited to, web pages visited, topics in the web pages, salient keywords in the web pages, content displayed on the web pages, content clicked on, search terms entered for searches performed, products purchased, users' geography, users' demography, etc. A user may opt in or out of allowing the content server to identify and store information about the user and/or about devices operated by the user.

Next, process 400 includes designating a performance target and an experimental threshold similarity score value (block 404). The performance target may be any factor identified by a content provider as being indicative of the interest in or usefulness of content placed on a web page. In various implementations, the performance target may be, for example, the number of users who qualify as a similar user, the number of times a similar user wins an auction and is provided with relevant content, the number of clicks on relevant content, the number of conversions resulting from viewing relevant content, the total revenue generated, etc. In general, a conversion refers to a user, corresponding to a network user identifier, performing a certain action. For example, a converting user may be a network user identifier who clicked on relevant content and was considered valuable because the network user identifier spent significant time on a web page, purchased a good or service, created a user profile on a web page, subscribed to receive marketing offers, downloaded software from a web page or any other action that may be performed online that is visible to the content provider and deemed to be a valuable parameter by the content provider.

In one implementation, a similar user count is designated as the performance target, and the content server designates a number of similar user identifiers to be returned (e.g. return 100 similar user identifiers). In another implementation, a click through rate is designated as the performance target, and the content server designates a click through rate percentage (e.g. return a click through rate of 60%). In yet another implementation, a conversion per dollar is designated as the performance target, and the content server designates a conversion rate (e.g. return 10 conversions per $1). In another implementation, a revenue is designated as the performance target, and the content server designates a revenue amount (e.g. return $10,000 revenue). Any other suitable performance target may be selected by a content provider or the content server.

Block 404 also includes designating an experimental threshold similarity score value. The experimental threshold similarity score is chosen as a starting value to initiate a feed-back loop. In one implementation, the experimental threshold similarity score is designated from a range of zero to one. The specific value of the experimental similarity score depends on which approach is used to set the threshold similarity score value for the first set of network user identifiers: 1) a high experimental threshold similarity score value or 2) a low experimental threshold similarity score value. The terms "high" and "low" may be, for example, relative to a median experimental similarity score 0.5. The two approaches used to set the threshold similarity score value for the first set of network user identifiers will be described in further detail below.

The experimental threshold similarity score value is the threshold similarity score value associated with a particular experiment. The threshold similarity score value is the threshold similarity score value associated with the first set of network user identifiers. In various implementations, the threshold similarity score value is set to the experimental threshold similarity score value when the experiment is concluded (e.g. when the desired performance target is achieved).

Process 400 further includes receiving a second set of network user identifiers and characteristic data associated with each network user identifier's network activity (block 406). Each network user identifier in the second set does not appear in the first set of network user identifiers. In various implementations, the second set of network user identifiers may include all network user identifiers visiting the content network that do not appear in the first set of network user identifiers. In other implementations, the second set of network user identifiers may include a subset of all network user identifiers visiting the content network that do not appear in the first set of network user identifiers. Characteristic data may include, but are not limited to, web pages visited, topics in the web pages, salient keywords in the web pages, content displayed on the web pages, content clicked on, search terms entered for searches performed, products purchased, users' geography, users' demography, etc. A user may opt in or out of allowing the content server to identify and store information about the user and/or about devices operated by the user.

Process 400 also includes calculating a similarity score between the first set of network user identifiers and each of the network user identifiers in the second set of network user identifiers (block 408). In the implementations in which the second set of network user identifiers include all network user identifiers visiting the content network that do not appear in the first set of network user identifiers, the calculation may be performed over multiple user sessions. The similarity score may be a value, variable, or function to be used by the processing circuit to indicate how similar network user identifiers in the second set are to the first set of network user identifiers. For example, in some embodiments, the similarity score may be a value, more specifically, a percentage, representing how many characteristic data a network user identifier in the second set shares with the first set of network user identifiers.

In addition, process 400 includes collecting performance statistics data for each of the network user identifiers in the second set of network user identifiers having a similarity score greater than or equal to the experimental threshold similarity score value (block 410). Performance statistics may include, but are not limited to, the number of users who qualify as a similar user, the number of times a similar user wins an auction and views relevant content, the number of clicks on relevant content, the number of conversions resulting from viewing relevant content, the total revenue generated, etc. The specific performance statistics collected correspond to the factor designated as the performance target. For example, if the similar user count is designated as the performance target, the number of users who qualify as a similar user or the similarity score of each qualification may be a performance statistics. Alternatively, if conversions per dollar is designated as the performance target, the number of conversions resulting from viewing relevant content may be a performance statistic.

Next, process 400 includes comparing the performance statistics data to the similarity score for each network user identifier in the second set of network user identifiers having a similarity score greater than or equal to the experimental threshold similarity score value (block 412). The performance statistics data and the similarity score can be compared by any known algorithm or by plotting the performance statistics data versus the similarity score. Based on the comparison, process 400 then includes adjusting the experimental threshold similarity score value to a similarity score that achieves the performance target (block 414). In various implementations, the threshold similarity score value is set to the experimental threshold similarity score value when the experiment is concluded (e.g. when the desired performance target is achieved). Both of these steps will be discussed in further detail below.

Figure 5:
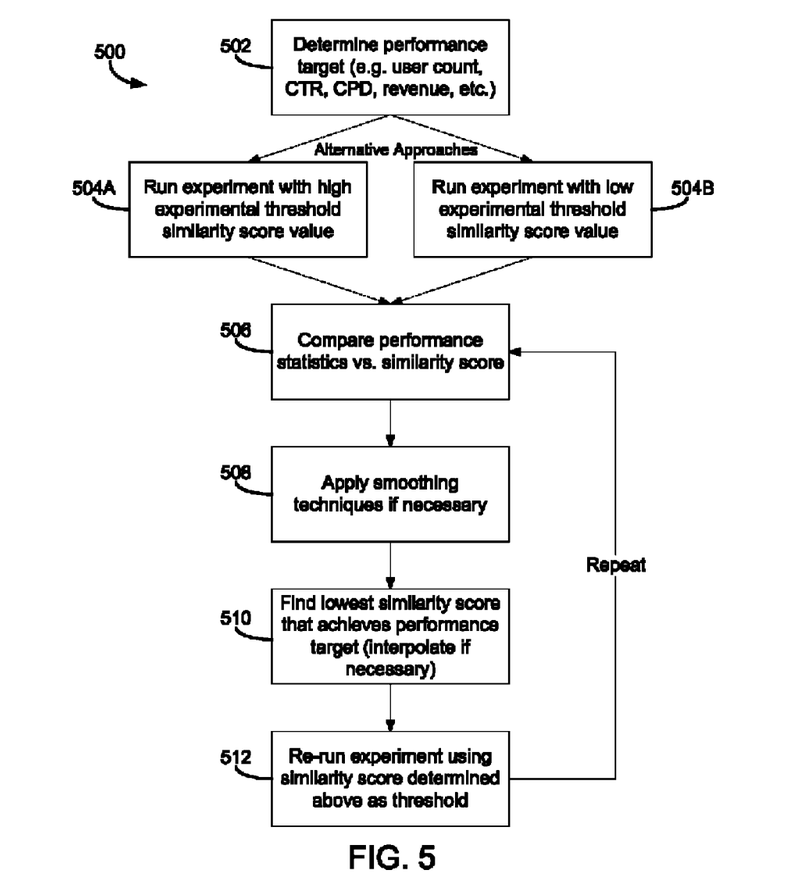
FIG. 5 is another example process for setting a threshold similarity score value for a set of network user identifiers.

In some implementations, as illustrated in FIG. 5, the processing circuit performs process 500 for setting a threshold similarity score value for a first set of network user identifiers. Process 500 may be implemented by a content server or other computing device having access to some or all of a network user's history data.

Process 500 includes designating a performance target (block 502). This step was described above in the discussion of block 404 of process 400. Process 500 further includes utilizing one of two alternative approaches: 1) running an experiment with a high experimental threshold similarity score value (hereafter "high similarity score approach") (block 504A) or 2) running an experiment with a low experimental threshold similarity score value (hereafter "low similarity score approach") (block 504B).

In one implementation, an experiment is run with a high experimental threshold similarity score value (block 504A). In this implementation, the experiment includes every user identifier in the second set of network user identifiers because designating a high threshold similarity score generally results in a small number of network user identifiers qualifying as similar users. Similar users are user identifiers in the second set of network user identifiers, similar to the user identifiers in the first set of network user identifiers. When using the high similarity score threshold approach, a high experimental threshold similarity score value is selected and the experiment is repeated until the desired performance target is achieved. With each iteration, the experimental threshold similarity score value is lowered, based in part on the comparison between the performance statistics data and the similarity scores (block 506). The high similarity score approach generally requires more iterations than the low similarity score approach because performance statistics data is not available over the entire range of similarity scores of interest to the content provider or content server. The threshold similarity score value is set to the experimental threshold similarity score value when the experiment is concluded (e.g. when the desired performance target is achieved).

For example, utilizing the high similarity score approach, an experimental threshold similarity score value of 0.7 is designated out of a possible range of zero to one. Thus, only network user identifiers in the second set of network user identifiers with a similarity score between 0.7 and 1.0 will qualify as similar users. Therefore, the experiment will exclude performance statistics data of network user identifiers with a similarity score below 0.7. For this example, assume similar user count is designated as the performance target. Specifically, the content server has designated a condition of returning 100 similar users to be the performance target.

In another implementation, an experiment is run with a low experimental threshold similarity score value (block 504B). In this implementation, the experiment includes only a small fraction of the network user identifiers in the second set of network user identifiers because designating a low similarity score generally results in a large number of network user identifiers qualifying as similar users. When using the low similarity score threshold approach, a low experimental threshold similarity score value is selected and the experiment is repeated until the desired performance target is achieved. With each iteration, the number of network user identifiers included in the experiment is increased because the set is initially very small with a low level of confidence. In some implementations, the experiment may be repeated until a specific level of confidence is achieved, for example, a 95% confidence level. Any percent confidence level may be used. The low similarity score approach generally requires fewer iterations than the high similarity score approach because performance statistics data is available over the entire range of similarity scores of interest to the content provider or content server. The threshold similarity score value is set to the experimental threshold similarity score value when the experiment is concluded (e.g. when the desired performance target is achieved).

For example, utilizing the low similarity score approach, an experimental threshold similarity score value of 0.01 is designated out of a possible range of zero to one. Thus, network user identifiers with a similarity score between 0.01 and 1.0 (e.g. almost all of the network user identifiers) will qualify as similar users. Because almost all of the network user identifiers will qualify as similar users, the experiment is run with only a randomly selected fraction of the network user identifiers in the second set of network identifiers. In one implementation, in order to randomly select network user identifiers from the second set of network user identifiers, network user identifiers are randomly distributed to different buckets. At first, one bucket of network user identifiers is used in the experiment but the number of buckets can be increased if there is not enough data. For this example, similar user count is designated as the performance target. Specifically, the content server has designated a condition of returning 100 similar users to be the performance target.

Process 500 further includes comparing the performance statistics data to the similarity scores (block 506). As described above, the performance statistics data is only collected, and thus, is only compared to the similarity scores when a network user identifier in the second set of network user identifiers has a similarity score greater than or equal to the experimental threshold similarity score value. In other words, performance statistics are not collected across the entire second set of network user identifiers, but instead, only in cases where the network user identifier clears the experimental threshold. In some implementations, this comparison is performed by plotting the performance statistics data versus the similarity scores. Referring to the example provided in the discussion of the high similarity score approach, the number of network user identifiers that qualify as similar users is plotted over the range similarity scores greater than or equal to 0.7. Because the network user identifiers that qualify as similar users will only represent a small fraction of the curve due to the high similarity score threshold, it may not be necessary to apply a smoothing technique (block 508) to the distribution.

Referring to the example provided in the discussion of the low similarity score approach, the number of network user identifiers that qualify as similar users is plotted over the range similarity scores greater than or equal to 0.01. The network user identifiers that qualify as similar users will have a full distribution because of the low similarity score threshold. Therefore, it may be necessary to apply a smoothing technique, such as a Gaussian smoothing function, to the distribution to reduce the effect of outliers and noise (block 508). Any known smoothing technique may be utilized.

Next, process 500 includes finding the lowest similarity score that achieves the performance target with a desired level of confidence (block 510). If the collected statistics curve covers the desired target, the experimental threshold similarity score value is adjusted to the lowest similarity score that achieves the performance target with the desired level of confidence. Using the examples from above, the lowest similarity score that returns 100 similar users with the desired level of confidence is selected as the threshold similarity score value for the first set of network user identifiers. If the collected statistics curve does not cover the desired target, interpolation may be used to extend the curve. For example, the processing circuit may assume a linear distribution on a segment of scores and extend the curve further. Again, the lowest similarity score that achieves the performance target with the desired level of confidence is selected as the threshold value for the first set of network user identifiers.

After the lowest similarity score is selected, the experiment is repeated using the selected similarity score as the experimental threshold similarity score value (block 512) (see also block 414 of process 400). The maximum change to the threshold can be limited by any value, for example, 0.01, 0.05, 0.1, etc., when the experiment is run again, such that there will not be strong deviations in the experimental similarity score threshold value if the curve is not accurate or contains outliers. If the experiment is concluded (e.g. if blocks 506, 508, 510 and 512 are not repeated), the final experimental threshold similarity score value is selected as the threshold value for the first set of network user identifiers.

The processing circuit may generate display data configured to display a plot of the performance statistics data versus the similarity score for each of the second set of network user identifiers.

By setting the threshold similarity score value for a first set of network user identifiers according to the implementations described herein, a content provider may set the value based on real-time or recent performance feedback. In other words, a threshold value may be initially set based on a conservative estimate, but may gradually converge to a desired target performance by reactively adjusting the threshold similarity score value for each user set.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs embodied in a tangible medium, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus or processing circuit on data stored on one or more computer-readable storage devices or received from other sources.

The term "client" or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface (GUI) or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the above description contains many specifics, these specifics should not be construed as limitations on the scope of the invention, but merely as exemplifications of the disclosed implementations. Those skilled in the art will envision many other possible variations that are within the scope of the invention as defined by the claims appended hereto.

What is claimed is:

1. A computerized method of setting a threshold similarity score value for a first plurality of network device identifiers, the method comprising:
    receiving, at a processing circuit, a first plurality of network device identifiers and characteristic data associated with network activity of each of the first plurality of network device identifiers;
    receiving, at the processing circuit, a second plurality of network device identifiers that do not appear in the first plurality of network device identifiers and characteristic data associated with network activity of each of the second plurality of network device identifiers;
    calculating, for each network device of the second plurality of network device identifiers, a similarity score that represents a degree of similarity between the characteristic data for the network device identifier of the second plurality and the characteristic data for the network device identifiers of the first plurality;
    designating, by the processing circuit, a performance target relating to a factor indicative of an interest in or usefulness of content placed on a webpage, the performance target used to identify a smallest number of network device identifiers of the second plurality of network device users that have performance statistics data relating to the factor, which when aggregated, achieves the designated performance target;
    designating, by the processing circuit, a threshold similarity score value selected as a starting value for determining a lowest similarity score value that is used to identify the smallest number of network device identifiers of the second plurality of network device users that have performance statistics data relating to the factor, which when aggregated, achieves the designated performance target;
    identifying a first number of network device identifiers from the second plurality that have similarity scores above the threshold similarity score value;
    receiving, by the processing circuit, for each of the identified network device identifiers of the second plurality that have a similarity score above the threshold similarity score value, performance statistics data corresponding to the factor related to the designated performance target;
    aggregating the performance statistics data of each of the identified network device identifiers to determine an aggregate performance statistics data;
    determining, from the aggregate performance statistics data, that the first number of network device identifiers is not the smallest number of network device identifiers of the second plurality of network device users that have performance statistics data relating to the factor, which when aggregated, achieves the designated performance target;
    iteratively adjusting, responsive to determining that the first number of network device identifiers is not the smallest number of network device identifiers of the second plurality of network device users that have performance statistics data relating to the factor, which when aggregated, achieves the designated performance target, the threshold similarity score value to identify the smallest number of network device identifiers of the second plurality of network device users that have performance statistics data relating to the factor, which when aggregated, achieves the designated performance target; and
    setting the adjusted threshold similarity score value to an experimental threshold similarity score value that represents the lowest similarity score value that identifies the smallest number of network device identifiers of the second plurality of network device users that have performance statistics data relating to the factor, which when aggregated, achieves the designated performance target.

2. The method of claim 1, wherein the designated performance target is at least one of a number of devices that qualify as a similar device to the first plurality of network device identifiers, a click through rate for content, a number of conversions, a conversion per dollar and a total revenue.

3. The method of claim 1, wherein receiving performance statistics data comprises receiving performance statistics data for a randomly selected subset of the second plurality of network device identifiers having a similarity score greater than or equal to the threshold similarity score value.

4. The method of claim 1, wherein the comparing further comprises plotting the performance statistics data versus the similarity score for each of the second plurality of network device identifiers having a similarity score greater than or equal to the threshold similarity score value.

5. The method of claim 3, further comprising applying a smoothing function to the performance statistics data after the plotting step.

6. The method of claim 3, further comprising interpolating the performance statistics data responsive to determining a distribution of the performance statistics data does not cover the designated performance target.

7. The method of claim 1, wherein the adjusting comprises selecting the lowest similarity score that identifies the smallest number of network device identifiers of the second plurality of network device users that have performance statistics data relating to the factor, which when aggregated, achieves the performance target as the experimental threshold value.

8. The method of claim 1, wherein the adjusting comprises selecting a lowest similarity score that identifies the smallest number of network device identifiers of the second plurality of network device users that have performance statistics data relating to the factor, which when aggregated, achieves the performance target with a predetermined level of confidence as the experimental threshold value.

9. The method of claim 1, further comprising repeating the method using the adjusted threshold similarity score value as the threshold similarity score value.

10. A system for setting a threshold similarity score value for a first plurality of network device identifiers, comprising: a hardware processing circuit operable to: receive the first plurality of network device identifiers and characteristic data associated with network activity of each of the first plurality of network device identifiers; receive a second plurality of network device identifiers that do not appear in the first plurality of network device identifiers and characteristic data associated with network activity of each of the second plurality of network device identifiers; calculate, for each network device of the second plurality of network device identifiers, a similarity score that represents a degree of similarity between the characteristic data for the network device identifier of the second plurality and the characteristic data for the network device identifiers of the first plurality; designate a performance target relating to a factor indicative of an interest in or usefulness of content placed on a webpage, the performance target used to identify a smallest number of network device identifiers of the second plurality of network device users that have performance statistics data relating to the factor, which when aggregated, achieves the designated performance target; designate a threshold similarity score value selected as a starting value for determining a lowest similarity score value that is used to identify the smallest number of network device identifiers of the second plurality of network device users that have performance statistics data relating to the factor, which when aggregated, achieves the designated performance target; identify a first number of network device identifiers from the second plurality that have similarity scores above the threshold similarity score value; receive, for each of the identified network device identifiers of the second plurality that have a similarity score above the threshold similarity score value, performance statistics data corresponding to the factor related to the designated performance target; aggregate the performance statistics data of each of the identified network device identifiers to determine an aggregate performance statistics data; determine, from the aggregate performance statistics data, that the first number of network device identifiers is not the smallest number of network device identifiers of the second plurality of network device users that have performance statistics data relating to the factor, which when aggregated, achieves the designated performance target; iteratively adjust, responsive to determining that the first number of network device identifiers is not the smallest number of network device identifiers of the second plurality of network device users that have performance statistics data relating to the factor, which when aggregated, achieves the designated performance target, the threshold similarity score value to identify the smallest number of network device identifiers of the second plurality of network device users that have performance statistics data relating to the factor, which when aggregated, achieves the designated performance target; and set the adjusted threshold similarity score value to an experimental threshold similarity score value that represents the lowest similarity score value that identifies the smallest number of network device identifiers of the second plurality of network device users that have performance statistics data relating to the factor, which when aggregated, achieves the designated performance target.

11. The system of claim 10, wherein the designated performance target is at least one of a number of devices that qualify as a similar device to the first plurality of network device identifiers, a click through rate for content, a number of conversions, a conversion per dollar and a total revenue.

12. The system of claim 10, wherein in receiving the performance statistics data, the processing circuit is further operable to receive performance statistics data for a randomly selected subset of the second plurality of network device identifiers having a similarity score greater than or equal to the threshold similarity score value.

13. The system of claim 10, wherein in the comparing, the processing circuit is further operable to plot the performance statistics data versus the similarity score for each of the second plurality of network device identifiers having a similarity score greater than or equal to the threshold similarity score value.

14. The system of claim 13, wherein after the plotting, the processing circuit is further operable to apply a smoothing function to the performance statistics data.

15. The system of claim 13, wherein the processing circuit is further operable to interpolate the performance statistics data responsive to determining a distribution of the performance statistics data does not cover the designated performance target.

16. The system of claim 10, wherein in the adjusting, the processing circuit is further operable to select the lowest similarity score that identifies the smallest number of network device identifiers of the second plurality of network device users that have performance statistics data relating to the factor, which when aggregated, achieves the performance target as the experimental threshold value.

17. The system of claim 10, wherein in the adjusting, the processing circuit is further operable to select a lowest similarity score that identifies the smallest number of network device identifiers of the second plurality of network device users that have performance statistics data relating to the factor, which when aggregated, achieves the performance target with a predetermined level of confidence as the experimental threshold similarity score value.

18. The system of claim 10, wherein the processing circuit is further operable to repeat the calculating, the identifying, the receiving, the iteratively adjusting and the setting using the adjusted threshold similarity score value as the threshold similarity score value.

19. A computer-readable storage device having instructions thereon that cause one or more processors to perform operations, the operations comprising:
receiving a first plurality of network device identifiers and characteristic data associated with network activity of each of the first plurality of network device identifiers;
receiving a second plurality of network device identifiers that do not appear in the first plurality of network device identifiers and characteristic data associated with network activity of each of the second plurality of network device identifiers;
calculating, for each network device of the second plurality of network device identifiers, a similarity score that represents a degree of similarity between the characteristic data for the network device identifier of the second plurality and the characteristic data for the network device identifiers of the first plurality;

designating a performance target relating to a factor indicative of an interest in or usefulness of content placed on a webpage, the performance target used to identify a smallest number of network device identifiers of the second plurality of network device users that have performance statistics data relating to the factor, which when aggregated, achieves the designated performance target;

designating a threshold similarity score value selected as a starting value for determining a lowest similarity score value that is used to identify the smallest number of network device identifiers of the second plurality of network device users that have performance statistics data relating to the factor, which when aggregated, achieves the designated performance target;

identifying a first number of network device identifiers from the second plurality that have similarity scores above the threshold similarity score value;

receiving, for each of the identified network device identifiers of the second plurality that have a similarity score above the threshold similarity score value, performance statistics data corresponding to the factor related to the designated performance target;

aggregating the performance statistics data of each of the identified network device identifiers to determine an aggregate performance statistics data;

determining, from the aggregate performance statistics data, that the first number of network device identifiers is not the smallest number of network device identifiers of the second plurality of network device users that have performance statistics data relating to the factor, which when aggregated, achieves the designated performance target;

iteratively adjusting, responsive to determining that the first number of network device identifiers is not the smallest number of network device identifiers of the second plurality of network device users that have performance statistics data relating to the factor, which when aggregated, achieves the designated performance target, the threshold similarity score value to identify the smallest number of network device identifiers of the second plurality of network device users that have performance statistics data relating to the factor, which when aggregated, achieves the designated performance target; and setting the adjusted threshold similarity score value to an experimental threshold similarity score value that represents the lowest similarity score value that identifies the smallest number of network device identifiers of the second plurality of network device users that have performance statistics data relating to the factor, which when aggregated, achieves the designated performance target.

20. The computer-readable storage device of claim 19, wherein the adjusting step comprises selecting a lowest similarity score that identifies the smallest number of network device identifiers of the second plurality of network device users that have performance statistics data relating to the factor, which when aggregated, achieves the performance target, as the experimental threshold value.

* * * * *